Feb. 28, 1950  J. E. WATSON ET AL  2,498,832
APPARATUS FOR CLASSIFYING AND SEPARATING
SUSPENDED PARTICLES FROM GASES
Filed May 13, 1946  2 Sheets-Sheet 2

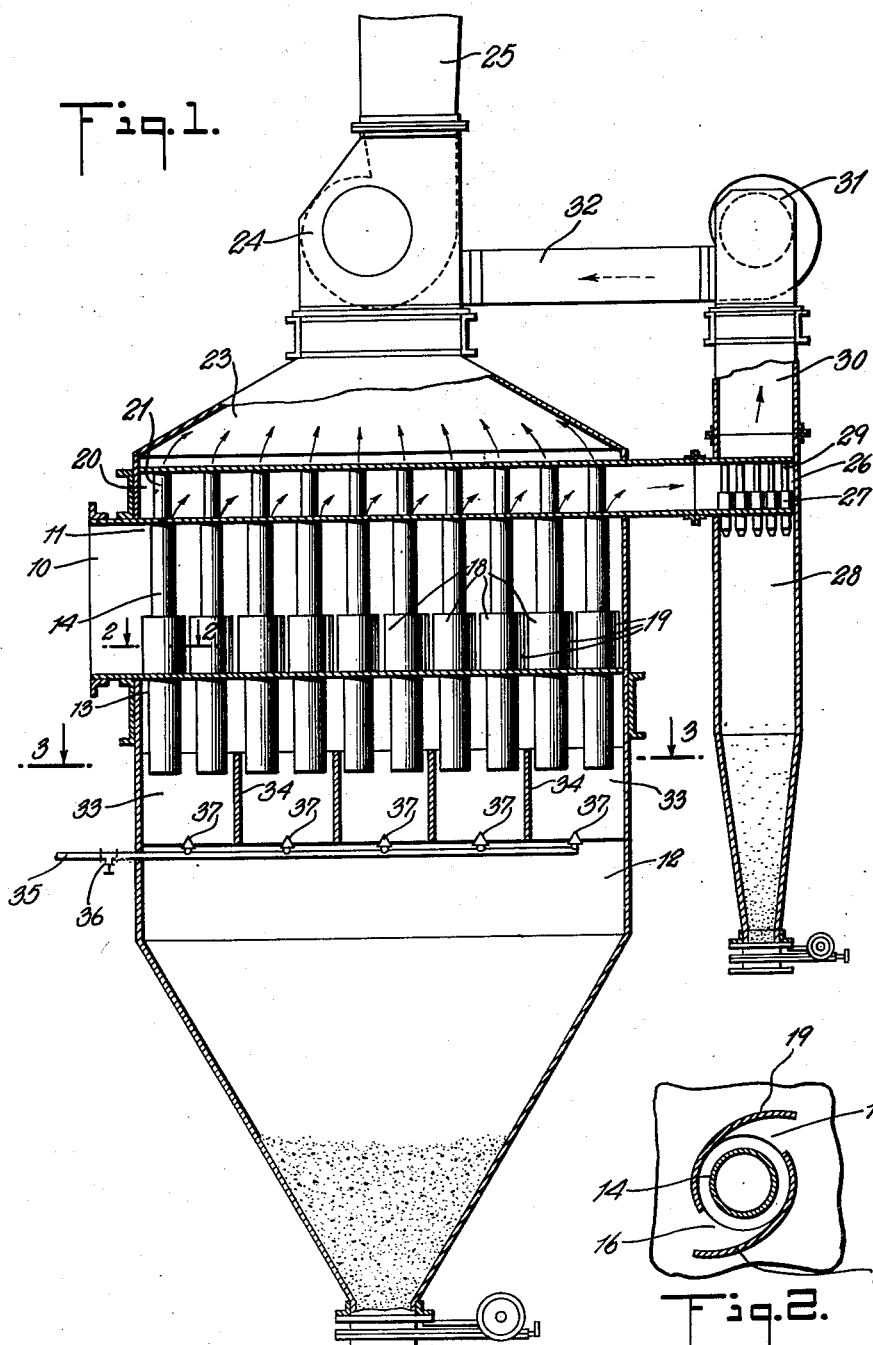

INVENTOR.
John E. Watson
Charles D. McBride
BY
Benj. T. Rauber
ATTORNEY

Patented Feb. 28, 1950

2,498,832

UNITED STATES PATENT OFFICE 2,498,832

APPARATUS FOR CLASSIFYING AND SEPARATING SUSPENDED PARTICLES FROM GASES

John E. Watson, Westport, Conn., and Charles B. McBride, Port Chester, N. Y., assignors to The Aerotec Corporation, Greenwich, Conn., a corporation of Connecticut Application May 13, 1946, Serial No. 669,290

9 Claims. (Cl. 209—144)

Our present invention relates to a method and apparatus for classifying and separating particles suspended in gases.

In many industrial operations in which solid particles are carried in suspension in gases or air it is desirable not only to separate the suspended particles from the air but also to separate the larger or heavier particles from the smaller or lighter particles. This is the case, for example, in cement manufacture where the particles of cement are carried in a stream of air which also carries admixed therewith smaller or lighter particles of a more alkaline nature which it is desirable not to have in admixture with the coarser or heavier cement particles.

In our present invention we provide a method and apparatus in which the dust laden gases are passed into centrifugal separating tubes in such a manner as to rotate in a spirally downward path about a central off-take pipe so that the particles are thrown centrifugally outwardly and permit the air or gas to then pass freed from the heavier or coarser particles upwardly through the off-take pipe while the heavier particles continue downwardly through the lower end of the centrifugal tube into a dust collecting bin. The centrifugal separation of the particles is, however, not entirely complete, the gases flowing through the off-take pipe carrying the finer particles.

In passing upwardly through the off-take pipe the gases continue to rotate and as the diameter of the pipe is less than that of the centrifugal tube the finer particles tend to concentrate in that part of the rotating gases nearest the surface of the off-take tube. This outermost layer of dust enriched gas may then be skimmed from the substantially clean inner column and subjected to a secondary separation to remove the finer particles.

Although there is a separation of the finer or lighter from the coarser or heavier particles in the above described centrifugal separation some of the lighter or smaller particles are entrapped with the heavier particles and thereby carried downwardly below the off-take tube toward or into the dust bin.

Inasmuch as the air supplied to the centrifugal tubes passes into the off-take pipe the space below the off-take pipe is quiescent and without upward buoying effect so that these lighter particles tend gradually to settle into the dust bin together with the coarser particles.

In our invention we provide a controlled admission of air or gas into the lower ends of the centrifugal tubes to create an upwardly buoying effect sufficient to lift the finer particles into the stream of air entering the off-take pipe without preventing the downward settling of the coarser or heavier particles. For this purpose the lower ends of the centrifugal tubes are enclosed in groups in compartments into which controlled streams of air are admitted. As there is some rotational movement below the ends of the centrifugal tubes this air distributes itself uniformly throughout each compartment and causes a slow up-draft into and through the lower parts of the centrifugal tubes sufficient to buoy up the lighter or smaller particles. In this way the air acts to wash the larger particles free from the smaller or lighter particles which are then returned to the off-take gases.

The various features of our invention are illustrated, by way of example, in the accompanying drawings in which:

Fig. 1 is a diagrammatic sectional elevation of an apparatus embodying a preferred form of our invention;

Fig. 2 is a horizontal section through a centrifugal tube taken on line 2—2 of Fig. 1;

Figure 4:
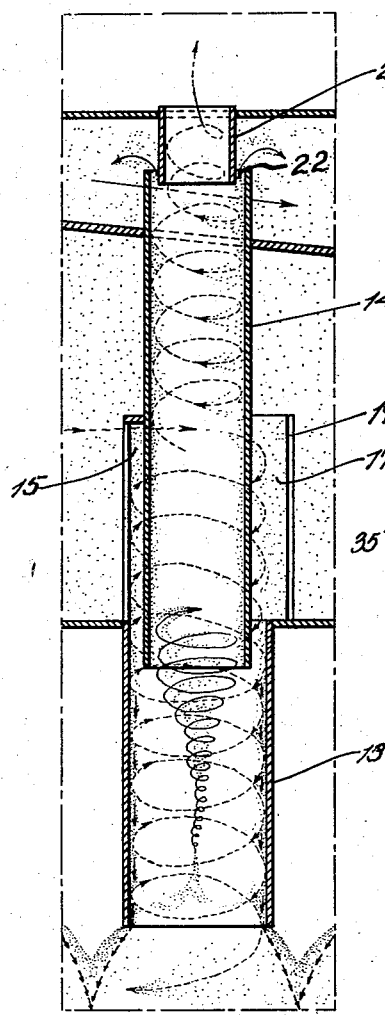
Fig. 4 is a vertical section on a larger scale of one of the centrifugal tubes.
Figure 3:
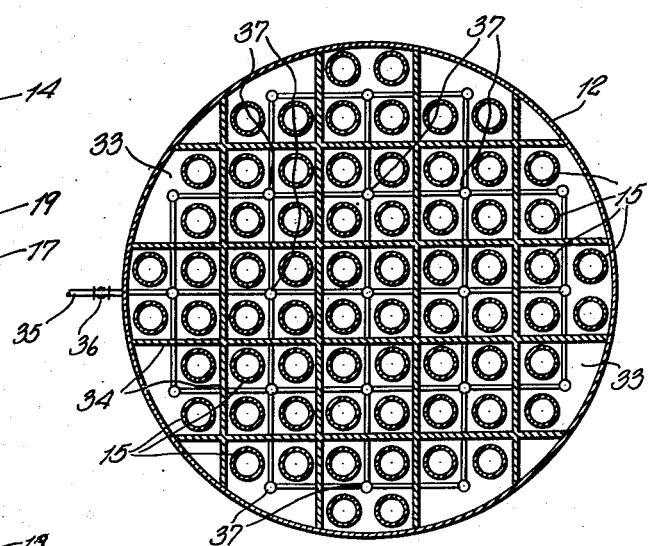
Fig. 3 is a horizontal sectional view of the apparatus taken on line 3—3 of Fig. 1.

Referring more particularly to Fig. 1 of the drawings, dust or particle laden air is supplied through an inlet 10 to a plenum chamber 11 positioned immediately above a dust bin 12. Mounted in the plenum chamber 10 are a number of centrifugal separating tubes 13. Each centrifugal tube has an off-take pipe 14 extending downwardly and co-axially in the upper part of the centrifugal tube to form an annular passage 15 therein. The upper end of the centrifugal tube is closed about the off-take pipe 14 and is provided with a suitable opening or openings for the admission in a tangential direction of dust laden air or gas from the plenum chamber, as shown in Fig. 2 by way of example.

Each tube has a pair of diametrically opposite openings 16 and 17 and tangential walls 18 and 19 so as to give the entering air a whirling or centrifugal movement. The lower end of the off-take pipe 14 is open and the dust laden air or gas passes spirally through the annular passage 15 to the lower end of the off-take pipe. During this spiral movement the heavier suspended particles are thrown centrifugally outwardly against the inner surface of the centrifugal tube and continue to move downwardly along this surface past the lower end of the off-take pipe. The separated particles then drop from the lower open end of the centrifugal tubes into the bin 12 while the gases fed from the heavier or coarser particles, but still containing finer or lighter particles, pass upwardly through the off-take pipe 14.

The off-take gases continue their rotational movement in off-take pipe 14 and the fine suspended particles still remaining in the gases become concentrated in the outermost layer of the off-take gases. This outermost dust laden layer is separated or skimmed from the innermost dust free portion of the off-take gases at the upper end of the off-take pipe which then enters an intermediate off-take chamber 20.

Any of the skimming arrangements shown in Patent 2,360,355 may be employed for this purpose. However as shown in Fig. 4 of the present application, by way of illustration, the upper end of the pipe 14 terminates in the chamber 20 and a second pipe or extension 21 extends axially downwardly into the upper end of the pipe 14 to form a narrow annular outlet space 22 through which the outermost layer of dust laden gas flows into the intermediate chamber 20 while the central dust free portion passes upwardly through the pipe 21 into the main off-take chamber 23. From the latter the air may be discharged or withdrawn by means of a fan 24 into an exhaust stack 25.

The residual dust in the gases entering the intermediate chamber 20 may be removed by any suitable means and this residual air then returned to the intake at the fan 24. The amount of air withdrawn through the chamber 20 is much smaller in amount than the amount of air treated in the apparatus.

The suspended particles may be separated from the gases drawn from the intermediate chamber 20 by means of a small centrifugal separating apparatus 26 which comprises smaller centrifugal tubes 27 which separate the suspended particles and discharge them into a second bin 28 and from which the dust-free air or gas passes through off-take pipes 29 to a flue 30 from which it is withdrawn by means of a fan 31 and delivered through a delivery pipe 32 to the intake at the fan 24.

It will be understood that the centrifugal tubes 27 are similar, or may be similar, to the tubes 13 but are preferably smaller in diameter to give a higher centrifugal effect sufficient to remove the finer particles.

The coarse particles separated in the tubes 13 may carry some of the finer or lighter particles entrained therewith. To remove or wash these finer particles from the coarser particles a very slow or moderate upward current of air is created in the upper part of the bin 12 and in the lower parts of the tubes 13. For this purpose the upper part of the bin is divided into compartments 33 by means of partitions 34 so that the lower ends or groups of centrifugal tubes 13 are encircled by walls 34 and enclosed in the compartments 33. The number of tubes in any group within a compartment may be of any desired number as, for example, four or nine or sixteen.

Into each compartment 33 a small controlled amount of air or gas is admitted from a supply pipe 35 having a control valve 36 and delivering to independent jet or outlet openings 37, one being shown by way of example for each compartment 33.

The amount of additional air or gas thus admitted to the compartments is sufficient to create an upward buoyant effect to carry the finer particles upwardly through the lower end of each tube 15 into the off-take pipe 14 but not sufficient to prevent the coarser particles from dropping into the bin 12. In any space below the lower ends of the tubes 15 air or gas tends to circulate in a rotary motion and the air or gas admitted through the jets or openings 37, therefore, mixes freely with this air and is distributed uniformly among the groups of tubes and then creates a slight upward draft sufficient to give the required buoyant effect. By dividing the upper end of the bin 12 into the compartments 33 the rotational movement is controlled so as to give the buoyant effect required for the separation of the finer from the coarser particles.

Through the above apparatus it is, therefore, possible not only to separate the suspended particles from the current of air or gas but to classify the particles. This is very desirable in many industries as, for example, in the cement industry where the finer particles are generally of a more alkaline nature than the coarser particles and would change the chemical characteristics of the product. Through the above apparatus, however, by removing the finer particles with air this undesirable change is avoided.

What we claim is:

1. Apparatus for classifying and separating suspended particles from gases which comprises a plenum chamber, an off-take chamber above said plenum chamber, a dust bin below said plenum chamber, centrifugal tubes in said plenum chamber to receive dust laden gases therefrom and delivering into said dust bin, said centrifugal tubes each having an off-take pipe extending into said off-take chamber, downwardly extending partitions in the upper part of said bin spaced to form compartments enclosing the lower ends of groups of said centrifugal tubes and means for admitting gases in controlled amounts to said compartments.

2. Apparatus for classifying and separating suspended particles from gases which comprises a plenum chamber, an off-take chamber above said plenum chamber, a dust bin below said plenum chamber, centrifugal tubes in said plenum chamber each tube having an opening to receive dust laden gases, the lower ends of said centrifugal tubes delivering into said dust bin, each of said centrifugal tubes having an off-take pipe delivering to said off-take chamber, downwardly extending partitions in the upper part of said dust bin spaced to form compartments enclosing the lower ends of groups of said centrifugal tubes, said compartments being open at their lower ends and means for admitting gases in controlled amounts to said compartments.

3. Apparatus for classifying and separating suspended particles from gases which comprises a plenum chamber, a dust bin, centrifugal tubes in said plenum chamber, each of said centrifugal tubes having an inlet to receive dust laden gases from said plenum chamber and having an off-take pipe to deliver cleaned gases outside of said plenum chamber, the opposite ends of said centrifugal tubes delivering into said dust bin and means for admitting controlled amounts of air in uniform distribution in the upper part of said dust bin and directly to said centrifugal tubes.

4. Apparatus for classifying and separating suspended particles from gases which comprises a plenum chamber, a dust bin, centrifugal tubes in said plenum chamber, each of said centrifugal tubes having an inlet to receive dust laden gases from said plenum chamber and having an off-take pipe to deliver cleaned gases outside of said plenum chamber, the opposite ends of said centrifugal tubes delivering into said dust bin, downwardly extending partitions in said dust bin spaced to form open ended compartments about groups of said centrifugal tubes and means comprising a jet for each said compartment to admit controlled amounts of air.

5. Apparatus for classifying and separating suspended particles from gases which comprises a plenum chamber, a dust bin, an off-take chamber and an intermediate chamber between said off-take chamber and said plenum chamber, centrifugal separators in said plenum chamber each having an off-take pipe extending from said intermediate chamber into said centrifugal tube to form an annular passage therein, each centrifugal tube having an opening to receive dust laden gases from said plenum chamber into said annular passage, each centrifugal tube having a delivery opening into said dust bin, downwardly extending partitions in said dust bin spaced to form compartments enclosing the delivery ends of groups of said tubes, means for admitting controlled amounts of air to the spaces enclosed by said partitions, an extension of said off-take pipes within said intermediate chamber and delivering to said off-take chamber to form annular passages to said intermediate chamber, means for withdrawing gases from said intermediate chamber and delivering them to said off-take chamber and secondary means for separating dust particles from said gases withdrawn from said intermediate chamber.

6. The apparatus of claim 5 in which said secondary means comprises centrifugal tubes of smaller diameter.

7. Apparatus for classifying and separating suspended particles which comprises a plenum chamber, a dust bin below said plenum chamber, an intermediate chamber above said plenum chamber and an off-take chamber above said intermediate chamber, centrifugal tubes in said plenum chamber each having an off-take pipe extending into said intermediate chamber and into its centrifugal tube to form an annular passage therein, said centrifugal tubes each having an opening to receive dust laden gas from said plenum chamber and to direct it to rotary motion in said annular passage and each centrifugal tube delivering into said dust bin, downwardly extending partitions in said dust bin spaced to form compartments to enclose groups of said tubes, means for admitting controlled amounts of air into said compartments, pipes co-axial with and extending from the ends of said off-take pipes in said intermediate chamber to said off-take chamber and forming annular outlets from said off-take tube to said intermediate chamber, a secondary separator and means to draw air from said intermediate chamber through said secondary separator.

8. Apparatus for classifying and separating suspended particles which comprises a plenum chamber, a dust bin below said plenum chamber, an intermediate chamber above said plenum chamber and an off-take chamber above said intermediate chamber, centrifugal tubes in said plenum chamber each having an off-take pipe extending into said intermediate chamber and a pipe extending into said off-take chamber and forming with said off-take pipe an annular opening into said intermediate chamber, said off-take pipe extending axially into its respective centrifugal tube to form therein an annular passage, said off-take pipe being open at its lower end within said centrifugal tubes, each centrifugal tube having an opening to receive dust laden gas from said plenum chamber into said annular passage, and each centrifugal tube delivering into said dust bin, downwardly extending partitions in said dust bin spaced to form compartments to enclose groups of said tubes, means for admitting controlled amounts of air into said compartments, a secondary separator and means to draw air from said intermediate chamber through said secondary separator.

9. The apparatus of claim 8 having an exhaust fan from said off-take chamber, and an exhaust fan from said secondary separator and delivering to the inlet of the exhaust fan from said off-take chamber.

JOHN E. WATSON.
CHARLES B. McBRIDE.

REFERENCES CITED

The following references are of record in the file of this patent:

UNITED STATES PATENTS

| Number | Name | Date |
| --- | --- | --- |
| 216,740 | King | June 24, 1879 |
| 472,682 | Paper et al. | Apr. 12, 1892 |
| 739,231 | Snee | Sept. 15, 1903 |
| 1,624,518 | Stebbins | Apr. 12, 1927 |
| 1,897,144 | Prouty | Feb. 14, 1933 |
| 2,102,525 | Freeman | Dec. 14, 1937 |
| 2,360,355 | McBride et al. | Oct. 17, 1944 |